United States Patent [19]

Bainbridge

[11] 4,201,054
[45] May 6, 1980

[54] HYDRAULIC MASTER CYLINDER

[75] Inventor: Wilfred Bainbridge, Banbury, England

[73] Assignee: Automotive Products Limited, Leamington Spa, England

[21] Appl. No.: 914,042

[22] Filed: Jun. 9, 1978

[30] Foreign Application Priority Data

Jun. 17, 1977 [GB] United Kingdom ............... 25342/77

[51] Int. Cl.² .............................................. B60T 11/20
[52] U.S. Cl. ..................................... 60/562; 60/568; 60/578; 60/591; 188/349; 303/6 C
[58] Field of Search ................ 60/562, 574, 576, 578, 60/581, 588, 591, 568, 561; 303/6 C; 188/349

[56] References Cited

U.S. PATENT DOCUMENTS

| 2,277,292 | 3/1942 | Bowen ................................... 60/578 |
| 3,232,058 | 2/1966 | Ayers, Jr. .............................. 60/562 |
| 3,382,675 | 5/1968 | Wallace ................................. 60/561 |
| 3,686,864 | 8/1972 | Shutt ..................................... 60/562 |
| 3,698,190 | 10/1972 | Miyai ..................................... 60/562 |
| 3,885,391 | 5/1975 | Campbell .............................. 60/581 |
| 3,914,941 | 10/1975 | Gardner ................................ 60/562 |

Primary Examiner—Abraham Hershkovitz
Attorney, Agent, or Firm—Kemon & Estabrook

[57] ABSTRACT

A tandem master cylinder for a vehicle split hydraulic braking system which has disc brakes in one part of the system and drum brakes in the other half. One of the pistons in the master cylinder is prevented from developing a substantial pressure until a predetermined pressure is developed by the other piston by virtue of a control piston working in a blind bore in one of the pistons. Hydraulic fluid is trapped in a control chamber formed by the blind bore and the control piston by a first valve means and released by a second valve means at the predetermined pressure. The arrangement allows pressure to the disc brakes to be delayed while pressure to the drum brakes is overcoming the effects of the usual pull-off springs.

5 Claims, 1 Drawing Figure

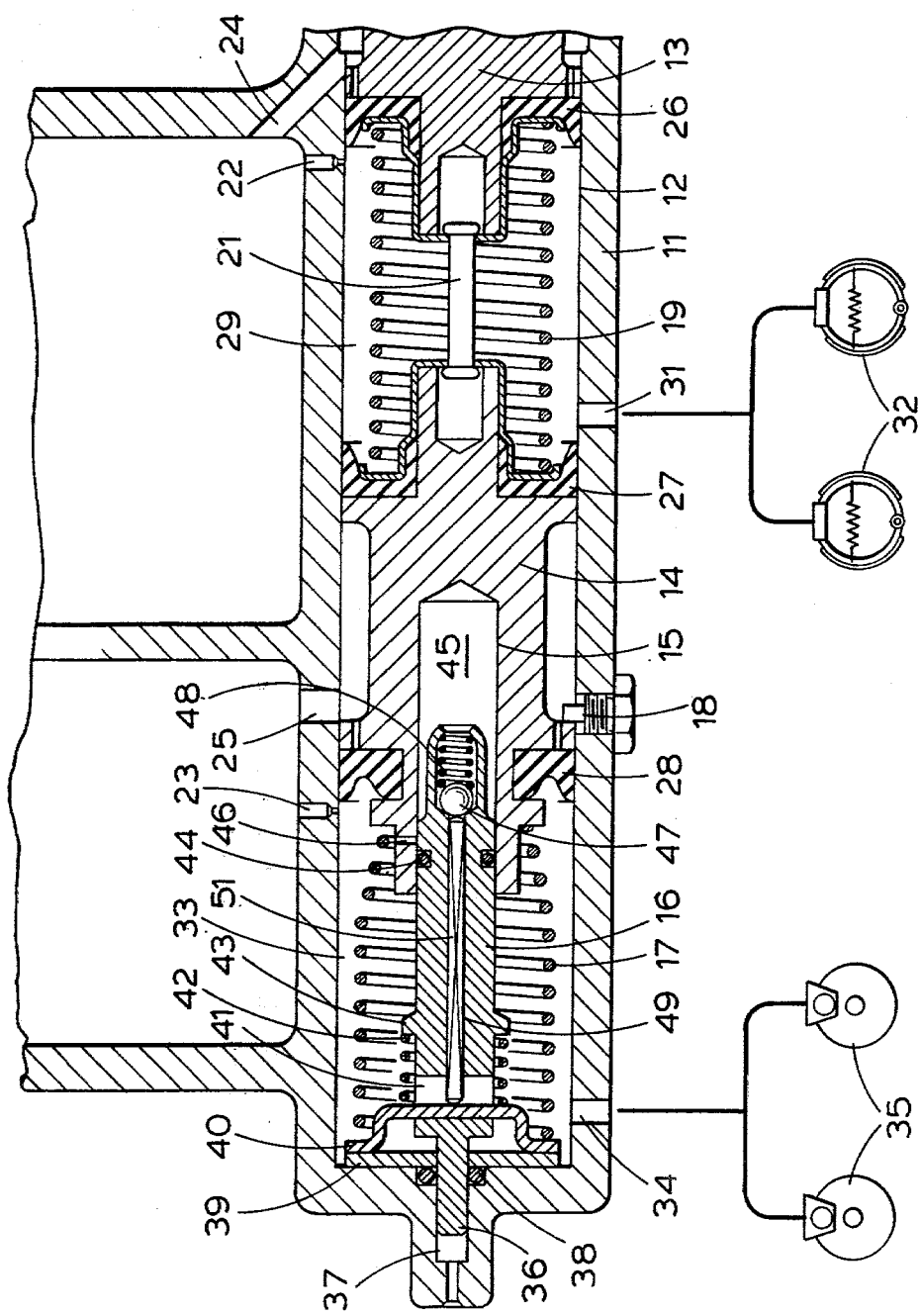

HYDRAULIC MASTER CYLINDER

The invention relates to hydraulic master cylinders for motor vehicle split braking systems of the kind in which disc brakes act on one set of wheels and drum brakes act on another set of wheels. In such braking systems it is sometimes desirable to prevent initial operation of the disc brakes until there is sufficient pressure in the drum brakes to overcome the effect of the usual brake shoe pull-off springs so that both sets of brakes start to work effectively at the same time.

Hold-off or delay valves which perform such a function are known, for example from U.S. Pat. No. 3,278,241, but since they are separate from the master cylinder they are necessarily an additional expense. It is thus an object of the invention to provide a hydraulic master cylinder for a split braking system of the kind described which in use will delay initial operation of the disc brakes until the drum brakes start to work effectively.

The invention provides a master cylinder for a motor vehicle split hydraulic braking system having disc brakes for acting on one set of wheels and drum brakes for acting on another set of wheels, the master cylinder comprising a first chamber for connection to the drum brakes and which in use is pressurised by a first piston, a second chamber for connection to the disc brakes and which in use is pressurised by a second piston, a control chamber which in use is pressurised by a control piston which is operable to retard movement of the second piston in the direction which pressurised the second chamber, and first and second valve means controlling the pressure in the third chamber in such a way that after an initial movement of the second piston in the brake-applying direction the first valve means operates to allow the control piston to prevent a substantial increase in the pressure in the second chamber until the pressure in the first chamber has risen to a predetermined value when the second valve means operates to allow pressure in the second chamber to increase.

The control chamber is conveniently arranged to communicate with the second chamber, the communication being closed by said first valve means and re-opened by the second valve means when the predetermined pressure in the first chamber is reached. However, the control chamber may be arranged to communicate with the first chamber or with the usual master cylinder reservoir. Preferably the second valve means meters the communication from the control chamber to the second chamber such that pressure in the second chamber increases progressively at a fixed rate with respect of pressure in the control chamber until the pressures in the second and control chambers are equalised, the second valve means remaining open with further increases in pressure in the control chamber.

The first valve means may be operated by movement of the second piston relative to the control piston or may be operated by pressure in the first chamber, the second chamber or the third chamber.

The invention will now be described by way of example and with reference to the accompanying drawing which shows a cross-section through a tandem hydraulic master cylinder according to the invention.

The tandem master cylinder comprises a housing body 11 having a bore 12 in one portion of which is slidable a first piston 13 and in another portion of which is slidable a second piston 14. The first (or primary) piston 13 is of conventional construction for operation in the usual manner by a driver's brake pedal or through a servo. The second (or secondary) piston 14 is also of conventional construction except that it has a blind axial bore 15 in which is slidable a control piston 16. The usual arrangement of preloaded piston return springs is provided; one preloaded spring 17 returns the secondary piston 14 against a stop pin 18 and another preloaded spring 19 biasses the primary and secondary pistons 13 and 14 away from each other, the separation of the pistons 13 and 14 being limited by a link pin 21 is a known manner.

A divided reservoir tank is cast integrally with the body 11 and the usual cut off ports 22 and 23 and recuperation ports 24 and 25 are provided. The pistons are provided with seals 26, 27 and 28 so that a first (or primary) chamber 29 is formed between the primary and secondary pistons 13 and 14 and is pressurised by brake-applying movement of the primary piston 13 towards the secondary piston 14, pressure being transmitted through a port 31 to rear drum brakes 32 of the vehicle. Similarly, a second (or secondary) chamber 33 is formed between the secondary piston 14 and the end of the master cylinder body 11, and is pressurised by brake-applying movement of the secondary piston 14 towards the end of the body 11, pressure being transmitted through a port 34 to front disc brakes 35.

The control piston 16 has a reduced diameter portion 36 which is slidable in a bore 37 in the end of the cylinder body 11. The end of bore 37 which adjoins the main master cylinder bore 12 has a recess for a seal ring 38 held in place by a washer 39 which in turn is held in position by spring 17 acting through a cranked plate 40. The other end of bore 37 is vented to atmosphere.

The plate 40 engages in a rectangular slot 41 in the piston 16 and a preloaded control spring 42 biasses the control piston 16 away from the end of the cylinder bore so that in the position shown the plate 40 abuts the side of the slot 41 nearer the reduced diameter piston portion 36, the control spring 42 acting between the plate 40 and a rib 43 on the outer surface of the control piston 16.

A seal 44 seals between the control piston 16 and bore 15 and so that a control chamber 45 is pressurised when the secondary piston 14 is moved in the brake-applying direction. However, in the position shown a port 46 is open to allow communication between the second chamber 33 and the control chamber 45. This port 46, with seal 44, acts as first valve means which blocks off the communication between the second chamber 33 and the control chamber when the secondary piston 14 has moved in the brake-applying direction by an initial amount.

Second valve means which re-opens communication between the second chamber 33 and the control chamber 45 comprises a ball 47 biassed by a spring 48 against a seat formed by a step in an axial stepped bore 49 in the control piston 16. The stepped bore 49 opens into the slot 41 and a pin 51 of triangular section is slidable within it. The pin 51 acts to unseat the ball 47 when the control piston 16 moves against the load of the control spring 42 by virtue of the end of the pin 51 abutting the plate 40.

The drawing shows the master cylinder in the normal position with the brakes 32 and 35 off. When the primary piston 13 is moved in a brake-applying direction it initially moves the secondary piston 14 by the same amount since spring 19 has a preload which is greater than that of spring 17. This causes ports 22 and 23 to be cut off almost simultaneously so that the secondary chamber 33 starts to pressurise. However, a small further movement of the secondary piston 14 in the brake-applying direction causes seal 44 to wipe over port 46 to block communication from the control chamber 45 to the secondary chamber 33. Thus a quantity of hydraulic fluid is trapped in the control chamber 45 so that pressure in the control chamber rises to temporarily prevent further movement of the secondary piston 14 in the brake-applying direction and hence a further increase in pressure to the disc brakes 35. The situation continues while spring 19 collapses and pressure builds up in the primary chamber 29 to bring the shoes of the drum brakes 32 against their drums and to begin effective braking. At or near the predetermined pressure in the first chamber 29 needed to begin effective braking at the drum brakes 32, the control spring 42 compresses under the effect of the increased pressure in the primary chamber 29 acting on the secondary piston 14 to allow further movement of the secondary piston 14 in the brake-applying direction and to allow the ball 47 to be nudged from its seat and re-open communication from the control chamber 45 to the secondary chamber 33.

The effect of nudging the ball 47 from its seat and allowing a quantity of fluid to escape from the control chamber 45 is to lower the pressure in the control chamber 45 whilst increasing pressure in the secondary chamber 33, which causes the control piston 16 to return under the bias of this control spring 42 and allow the ball 47 to reseat. A small further brake-applying movement of the secondary piston 14 unseats ball 47 again so that the ball 47 meters the communication from the control chamber 45 to the secondary chamber 33. The control piston 16 acts as differential area piston means to control the seating of ball 47 since it has a smaller effective area acted on by pressure in the secondary chamber 33 than is acted on by pressure in the control chamber 45. Hence the pressure in the secondary chamber 33 increases progressively with respect to pressure in the control chamber 45 at a rate fixed by these effective areas until the pressures are equalised. The ball 47 then remains unseated for further increases in pressure in the secondary chamber 33. The master cylinder now functions as a normal tandem master cylinder.

The master cylinder may be re-arranged so that piston 14 is actuated by the servo or driver's pedal and thus becomes the primary piston and piston 13 becomes the secondary piston, the control piston 16 acting between pistons 13 and 14.

The invention has been described with particular reference to a tandem master cylinder but is not restricted to this type since it is also applicable to twin-bore master cylinders in which the first and second pistons are arranged side-by-side and are operated through a beam or similar mechanism which apportions the driver's effort.

I claim:
1. A master cylinder for a motor vehicle split hydraulic braking system having disc brakes for acting on one set of wheels and drum brakes for acting on another set of wheels, the master cylinder comprising:
  a housing body;
  first and second bore portions in the housing body;
  a first piston slidable in the first bore portion and a second piston slidable in the second bore portion;
  a first chamber in the housing body for connection to the drum brakes and which in use is pressurized by the first piston;
  a second chamber in the housing body for connection to the disc brakes and which in use is pressurized by the second piston;
  a blind bore in one of said pistons;
  a control piston connected to said housing body;
  said control piston slidably positioned in said blind bore;
  a control chamber in said one piston defined by the blind bore and the control piston, pressure in the control chamber acting to retard movement of the second piston in the brake-applying direction;
  first valve means operable to trap a quantity of hydraulic fluid in the control chamber, and second valve means operable to release fluid from the control chamber, the arrangement being such that after an initial movement of the second piston in the brake-applying direction the first valve means operates to allow the control piston to pressurize the control chamber and prevent a substantial increase in the pressure in the second chamber until the pressure in the first chamber has risen to a predetermined magnitude to cause further movement of the second piston at which the second valve means operates to reduce pressure in the control chamber to allow movement of the second piston to increase pressure in the second chamber.

2. The master cylinder of claim 1, wherein the said first and second valve means control communication between the control chamber and said second chamber.

3. The master cylinder of claim 1, wherein differential area piston means controls the second valve means to meter flow from the control chamber such that pressure in the second chamber increases progressively at a fixed rate with respect to pressure in the control chamber until the pressures in the second and control chambers are equalized, the second valve means remaining open with further increases in pressure in the control chamber.

4. The master cylinder of claim 3, wherein the control piston constitutes said differential area piston means.

5. The master cylinder of claim 1, wherein the first valve means is operated by movement of the second piston relative to the control piston.

* * * * *